Oct. 11, 1927.
J. SLEPIAN
1,645,303
MAGNETIC FREQUENCY CHANGER
Filed Aug. 18, 1921
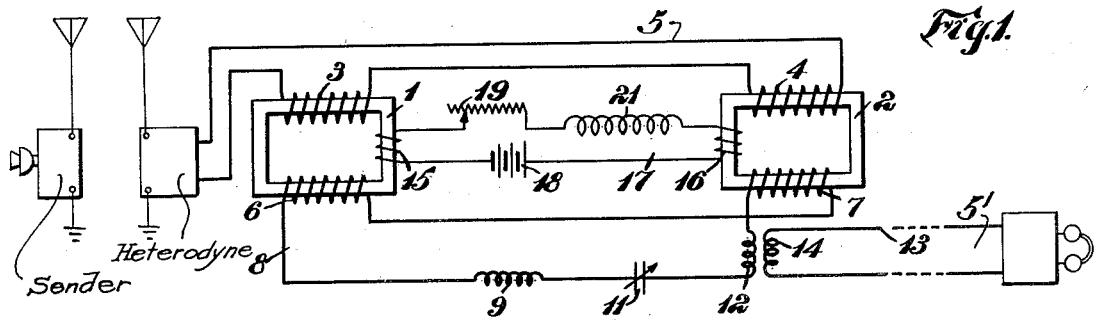
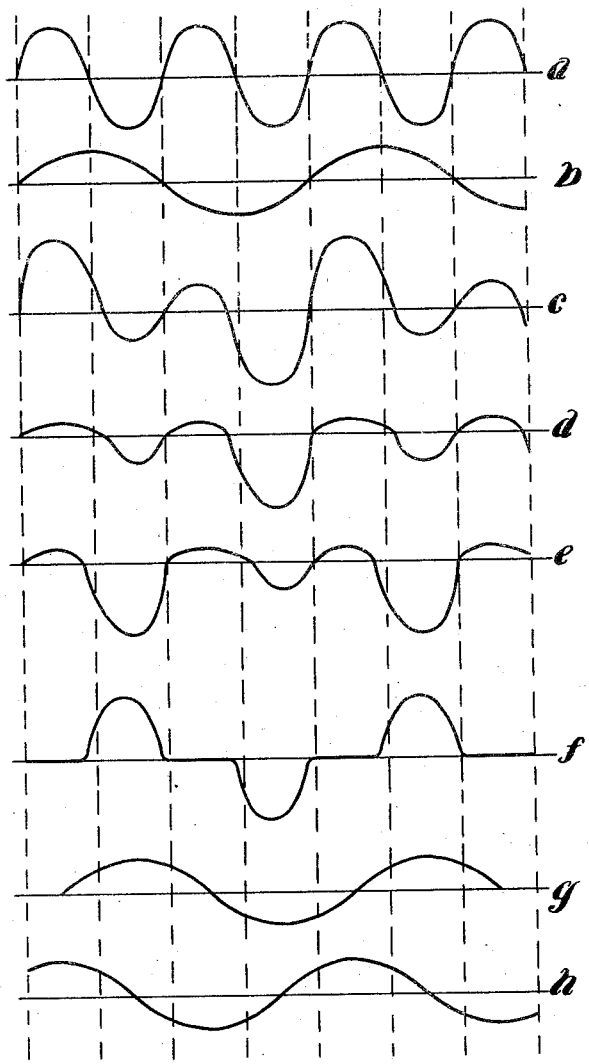
WITNESSES:
INVENTOR
Joseph Slepian
BY
ATTORNEY Patented Oct. 11, 1927.

1,645,303

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

MAGNETIC FREQUENCY CHANGER.

Application filed August 18, 1921. Serial No. 493,356.

My invention relates to frequency changers and to electrical systems utilizing the same.

One of the objects of my invention is to provide a frequency reducer which is based on the saturating property of an iron core, whereby alternating currents of one frequency may be transformed into alternating currents of a lower frequency.

In carrying my invention into effect, I provide two closed transformer cores, primary and secondary windings for each transformer core, means for initially magnetizing the transformer cores to the knees of their saturation curves, a primary circuit including said primary windings and a source of energy, and a tuned secondary circuit including said secondary windings.

The particular novelty of my invention, however, consists in the utilization of a secondary circuit, which is tuned to substantially one-half the frequency of the currents in the primary circuit, thereby admitting of a transfer of energy from the primary to the secondary circuit tending to sustain the half-frequency currents therein.

A further object of my invention is to provide an improved radio receiving system utilizing the principles of frequency-reducers.

These and other objects of my invention, as well as details of construction, whereby my invention may be utilized, will be apparent from the following description, when read in connection with the accompanying drawing, wherein;

Fig. 1 is a diagrammatic view of circuits and apparatus embodying my invention; and Fig. 2 is a series of curve diagrams explaining the theory of operation of my invention.

In the drawing, I have shown two transformer cores 1 and 2 on which are wound primary windings 3 and 4, respectively, and connected in series relation in a circuit 5 which is operatively connected to a source of alternating currents (not shown). Secondary windings 6 and 7 are also wound upon the transformer cores 1 and 2, respectively, and are oppositely connected in a secondary or so-called "half frequency" circuit 8 which may also include a tuning coil 9, a variable condenser 11 and a coupling coil 12. The coupling coil 12 is operatively connected to an outgoing circuit 13, through a coupling coil 14.

The degree of saturation of the transformer cores 1 and 2 may be controlled by means of magnetizing windings 15 and 16, respectively, which are connected, in the same direction as the primary windings 3, 4, in a circuit 17 that may also contain a source of energy 18, a variable resistor 19 and a radio-frequency choke coil 21.

In operation, the flux densities of the cores of the transformers 1 and 2 are adjusted to the knees of their saturation curves by means of the variable resistor 19. Upon the energization of the primary circuit 5, the electromotive forces of primary frequency which are induced within the secondary windings 6 and 7 are opposite in direction, and, therefore, cancel each other. I have found, however, that, upon the tuning of the secondary circuit 8 to a frequency which is substantially one-half that of the currents in the primary circuit, any currents of one-half frequency that are set up from any cause, as by a slight jar, in the secondary circuit 8, are sustained and augmented by energy derived from the primary circuit 5.

The result just stated may be explained more readily by referring to the curve diagrams shown in Fig. 2, wherein: curve $a$ shows the wave form of the current in the primary circuit 5; curve $b$ shows the wave form of the currents in the half-frequency circuit 8. The half-frequency currents in circuit 8 are assumed to be already started upon some slight unbalancing of the constants of the circuit. Curve $c$ shows the total ampere turns on transformer 1. Curve $d$ shows the flux in transformer 1. Curve $e$ shows the flux in transformer 2. Curve $f$, which is obtained by subtracting curve $e$ from curve $d$, shows the flux linkages with the transformer windings 6 and 7. Curve $g$ shows the fundamental component of curve $f$, while the curve $h$, which is obtained by taking the slope of curve $g$, shows the fundamental component of voltage in the half-frequency circuit.

Upon comparing curves $h$ and $b$, it will be seen that there is a component of half-frequency voltage which is in phase with the half-frequency currents, thereby admitting of a transfer of energy from the primary circuit to the half-frequency circuit. Thus, half-frequency oscillations in the secondary circuit are sustained.

Assuming the flux density of each transformer core to be adjusted to the knee of its saturation curve, then the flux linkages of each of the transformer windings 3 and 6 may be approximated by the quadratic equation $\Phi = Li + L_1 i^2$ and, similarly, the flux linkages of each of the transformer windings 4 and 7 is given by the equation $\Phi = Li + L_1 i^2$; where $i$ is the instantaneous value of the current in the primary circuit and $L$, $L_1$ are constants dependent upon the circuits. Calculations show, then, that, if current I traverses the primary circuit 5 and if the half-frequency circuit 8 is tuned to resonance with the half-frequency currents therein, a half-frequency electromotive force in phase with the half-frequency currents appears of a maximum value $$\frac{1}{2} \cdot 10^{-8} L_1 \omega I I_1$$

where $I_1$ is the current in the half frequency circuit. Therefore, if $$\frac{1}{2} \cdot 10^{-8} L_1 \omega I$$

exceeds the resistance of the half-frequency circuit, oscillations will be maintained therein.

One application of the principle characterizing my invention is in wireless receiving systems where the frequency of the received signal impulses could be successively halved until they become audible.

Another application is in the heterodyning of short wave lengths. As is well known, the heterodyning of very short wave lengths is difficult because of the necessity of maintaining a high degree of constancy in the frequency of the transmitted and heterodyning energy so as to keep the heterodyning note within audible limits. By the use of my invention, however, the heterodyned note may be above audibility and then may be made audible by successive halving of the frequency.

The conductors 5' at the lower right hand corner of Fig. 1 lead to an apparatus like that illustrated in detail in the central part of Fig. 1. This apparatus is represented by the rectangle at the right hand end of the conductors 5'. The output from the final one of a succession of said repetitions of the apparatus will be of audio frequency and this is indicated by the telephones at the right hand side of said rectangle.

While I have shown my invention embodied in a specific system, it is capable of various changes and modifications without departing from the spirit of my invention. I desire, therefore, that only such limitations shall be imposed thereon as are set forth in the appended claims.

I claim as my invention:

1. The combination with a circuit carrying modulated oscillatory currents of relatively high frequency, of a device for changing the energy of said currents into currents having a lower frequency, said device comprising a pair of iron-core transformers having their primary windings energized from said high-frequency circuit, a tuned circuit of relatively low frequency associated with the secondary windings of said transformers, said secondary windings being connected in opposite directions with respect to said primary windings, and means for producing an unidirectional component of flux in said transformer windings in the same direction with respect to said primary windings.

2. In a carrier-current telegraph system, means for producing a heterodyned note above audibility and means including a magnetic circuit and an audio frequency tuned circuit for producing modulated currents of audio frequency from the energy of the first-named currents, said magnetic circuit containing iron that is maintained in a condition corresponding to the knee of its saturation curve.

3. In a receiving system, the combination with a circuit carrying modulated currents of ultra-audio frequency, of a device for changing the energy of said currents into currents having a lower frequency, said device comprising a pair of iron-core transformers having their primary windings energized from said high-frequency circuit, a tuned circuit of relatively low frequency associated with the secondary windings of said transformers, said secondary windings being connected in opposite directions with respect to said primary windings, and means for producing a unidirectional flux in said transformer cores in the same direction with respect to said primary windings, said flux corresponding to the knee of the saturation curve.

4. The combination with a circuit carrying modulated oscillatory currents of relatively high frequency, of a device for changing the energy of said currents into currents having a lower frequency, said device comprising a pair of iron-core transformers having their primary windings energized from said high-frequency circuit, a tuned half-frequency circuit associated with the secondary windings of said transformers, said secondary windings being connected in opposite directions with respect to said primary windings, and means for producing a unidirectional component of flux in said transformer windings in the same direction with respect to said primary windings.

5. In a receiving system, the combination with a circuit carrying modulated currents of ultra-audio frequency, of a device for changing the energy of said currents into currents having a lower frequency, said device comprising a pair of iron-core transformers having their primary windings energized from said high-frequency circuit, a tuned half-frequency circuit associated with the secondary windings of said transformers, said secondary windings being connected in opposite directions with respect to said primary windings, and means for producing a unidirectional flux in said transformer cores in the same direction with respect to said primary windings, said flux corresponding to the knee of the saturation curve.

6. Apparatus for transforming the frequency of alternating currents comprising a pair of magnetic circuits, a primary and a secondary magnetizing coil for each magnetic circuit, means for unidirectionally energizing both magnetic circuits, a primary circuit having alternating currents therein and also including said primary windings, a secondary circuit including said secondary windings, said coils being so connected that double-frequency electromotive forces would be produced in said primary circuit upon the energization of said secondary circuit, and means included in said secondary circuit whereby currents of a frequency lower than that of said primary currents may be sustained therein upon the energization of said primary circuit.

7. Apparatus for transforming the frequency of alternating currents comprising a pair of magnetic circuits, a primary and a secondary magnetizing coil for each magnetic circuit, means for initially energizing both magnetic circuits, a primary circuit for connecting said primary windings in series relation and having alternating currents therein, a secondary circuit for connecting said secondary windings in opposition and means included in said secondary circuit, whereby currents of a frequency lower than that of said primary currents may be sustained therein upon the energization of said primary circuit.

8. Apparatus for transforming the frequency of alternating currents comprising a pair of magnetic circuits, a primary and a secondary magnetizing coil for each magnetic circuit, means for energizing both magnetic circuits substantially to the knees of their saturation curves, a primary circuit for connecting said primary windings in series relation and having alternating currents therein, a secondary circuit for connecting said secondary windings in opposition and means included in said secondary circuit whereby currents of a frequency lower than that of said primary currents may be sustained therein upon the energization of said primary circuit.

9. Apparatus for transforming the frequency of alternating currents comprising a pair of magnetic circuits, a primary and a secondary magnetizing coil for each magnetic circuit, means for initially energizing both magnetic circuits, a primary circuit for connecting said primary windings in series relation and having alternating currents therein, a secondary circuit for connecting said secondary windings in opposition and means included in said secondary circuit whereby currents of substantially one-half the frequency of the currents in said primary circuit may be sustained in said secondary circuit by energy derived from said primary circuit.

10. Apparatus for transforming the frequency of alternating currents from a given value to a lower value comprising a pair of transformers the primaries of which are connected in series and secondaries of which are connected in opposition, means for adjusting the flux density of said transformers to some predetermined value, a primary circuit having alternating currents therein and containing said primary windings, and a secondary circuit including said secondary windings, said secondary circuit also including means whereby currents of a frequency lower than that of the currents in said primary circuit may be sustained therein by energy derived from the primary circuit.

11. Apparatus for transforming the frequency of alternating currents from a given value to a lower value comprising a pair of transformers the primaries of which are connected in series and the secondaries of which are connected in opposition, means for adjusting the flux density of said transformers to some predetermined value, a primary circuit having alternating currents therein and containing said primary windings, and a secondary circuit including said secondary windings, said secondary circuit being tuned to a frequency substantially one-half that of the currents in said primary circuit, whereby the currents in said secondary circuit may be sustained by energy derived from said primary circuit.

12. Apparatus for transforming the frequency of alternating currents from a given value to a lower value comprising a pair of transformers the primaries of which are connected in series and the secondaries of which are connected in opposition, means for adjusting the flux density of said transformers to the knees of their saturation curves, a primary energizing circuit having alternating currents therein and containing said primary windings and a secondary circuit including said secondary windings, said secondary circuit being so tuned that currents of substantially one-half the frequency of the currents in said primary circuit may be sustained therein by energy derived from said primary circuit.

13. An apparatus for producing low-frequency currents from currents of higher frequency comprising an input circuit, an output circuit and a magnetic circuit linking the input and output circuits, the output circuit being tuned for said low-frequency currents and being equally conductive throughout in both directions.

14. An apparatus for producing low-frequency currents from currents of higher frequency comprising an input circuit, an output circuit and a plurality of magnetic circuits linking the input and output circuits, the output circuit being tuned for said low-frequency currents and being equally conductive throughout in both directions.

15. An apparatus for producing low-frequency currents from currents of higher frequency comprising an input circuit, an output circuit, a magnetic circuit linking the input and output circuits, and conditioning means tending to keep the material of said magnetic circuits in a condition in which it passes flux asymmetrically, the output circuit being tuned for said low-frequency currents and being equally conductive throughout in both directions.

16. In combination, a source of high-frequency current, a circuit fed therefrom, a circuit tuned to a low frequency, connecting means interlinking said two circuits and deriving its periodic energy wholly from said high-frequency currents, said connecting means including frequency-lowering devices whereby current of the frequency to which it is tuned is produced in said low-frequency circuit.

17. The method of converting high-frequency currents into low-frequency currents which comprises causing the magneto-motive force of said high-frequency currents to act upon a medium more responsive to magneto-motive force in one sense than in the opposite sense, inducing currents from the resultant changes of flux and resonantly receiving said induced currents.

In testimony whereof, I have hereunto subscribed my name this 16th day of August 1921.

JOSEPH SLEPIAN.